Aug. 21, 1956  W. G. CARTTER  2,759,472
OVERHEAD FUEL BURNING HEATERS
Filed Dec. 15, 1952  5 Sheets-Sheet 1
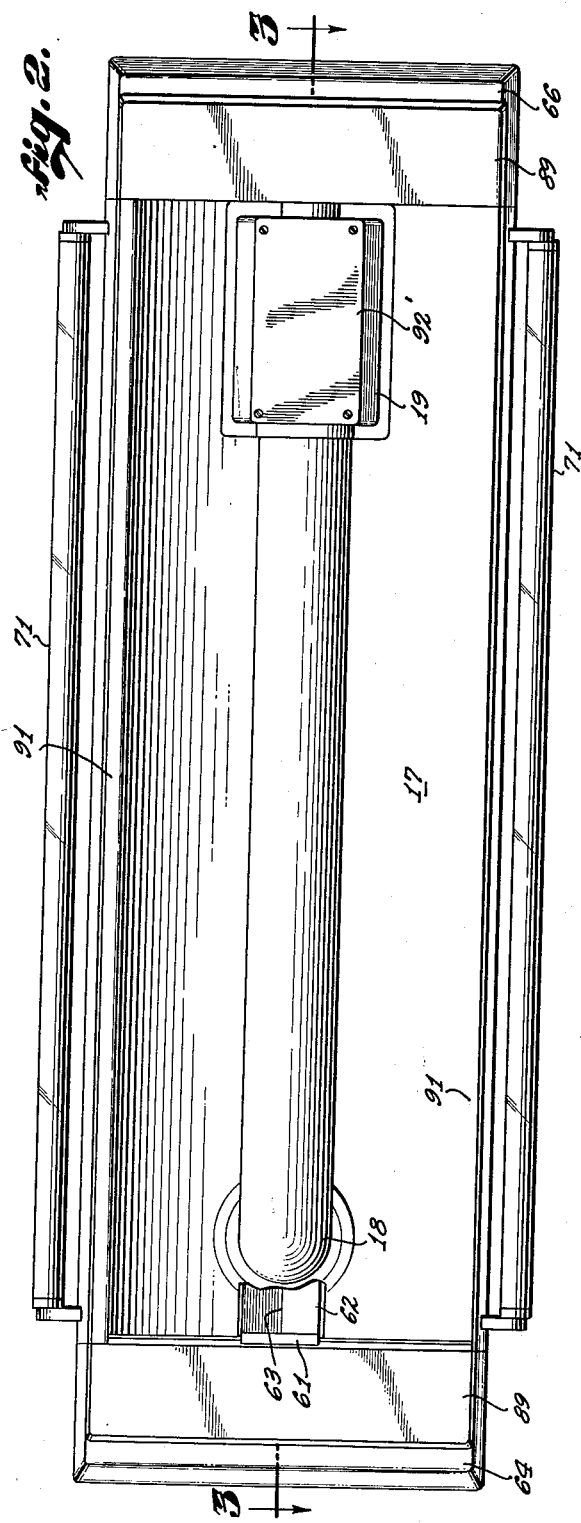
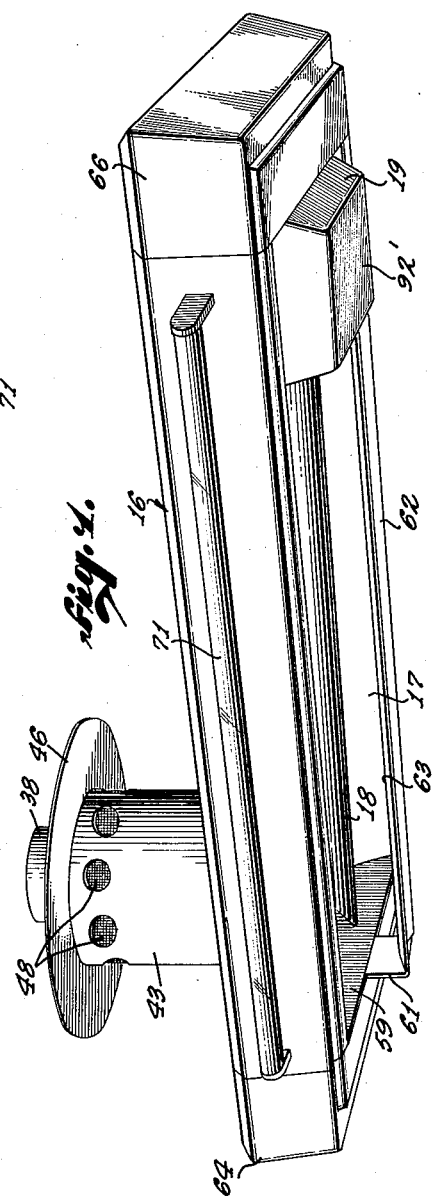
WILLIAM G. CARTTER.
*INVENTOR.*
HUEBNER, BEEHLER,
WORREL & HERZIG,
*ATTORNEYS.*
BY
Warren T. Jessup Aug. 21, 1956 W. G. CARTTER 2,759,472
OVERHEAD FUEL BURNING HEATERS
Filed Dec. 15, 1952 5 Sheets-Sheet 2
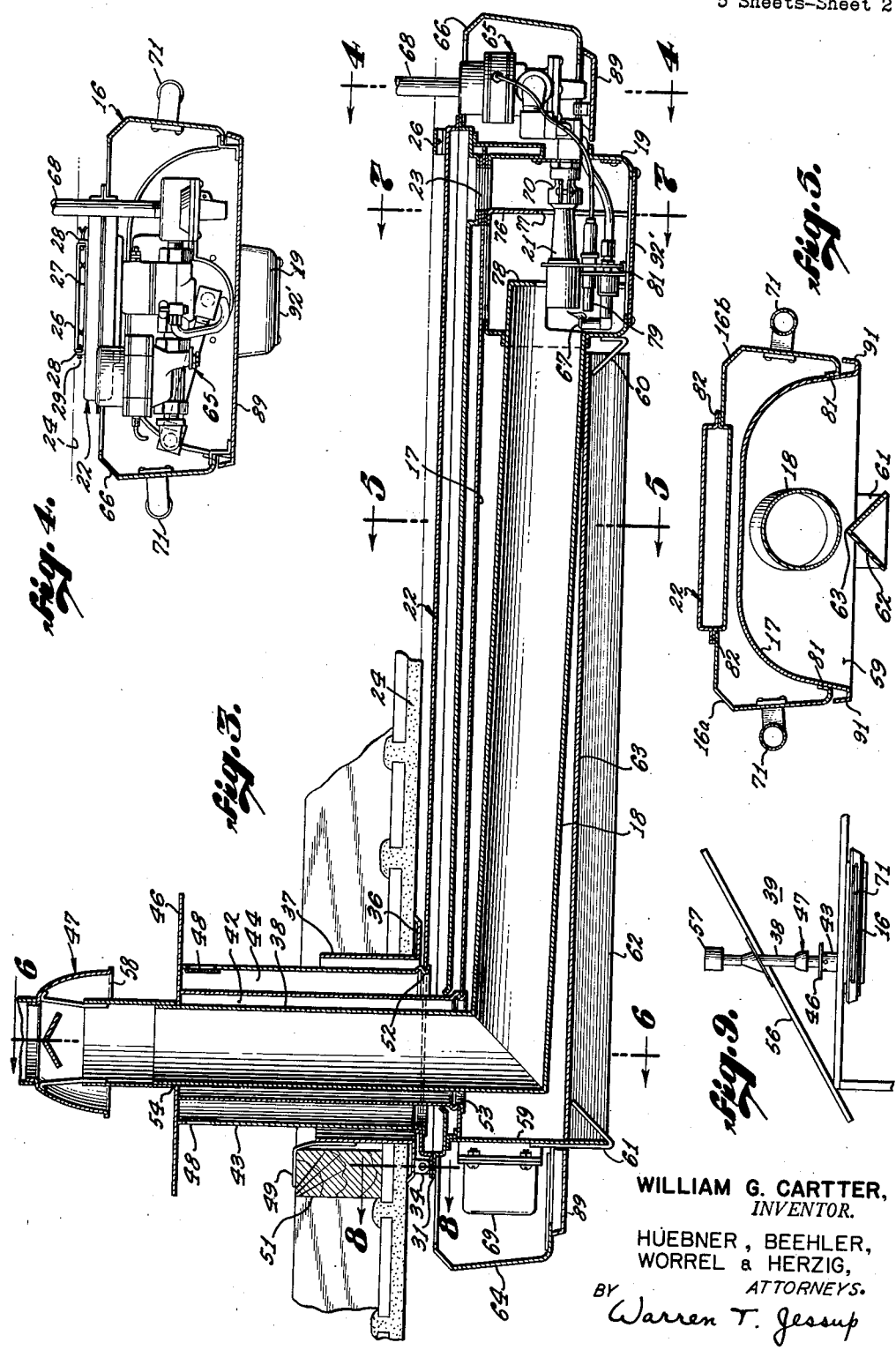
WILLIAM G. CARTTER,
*INVENTOR.*
HUEBNER, BEEHLER,
WORREL & HERZIG,
ATTORNEYS.
BY Warren T. Jessup

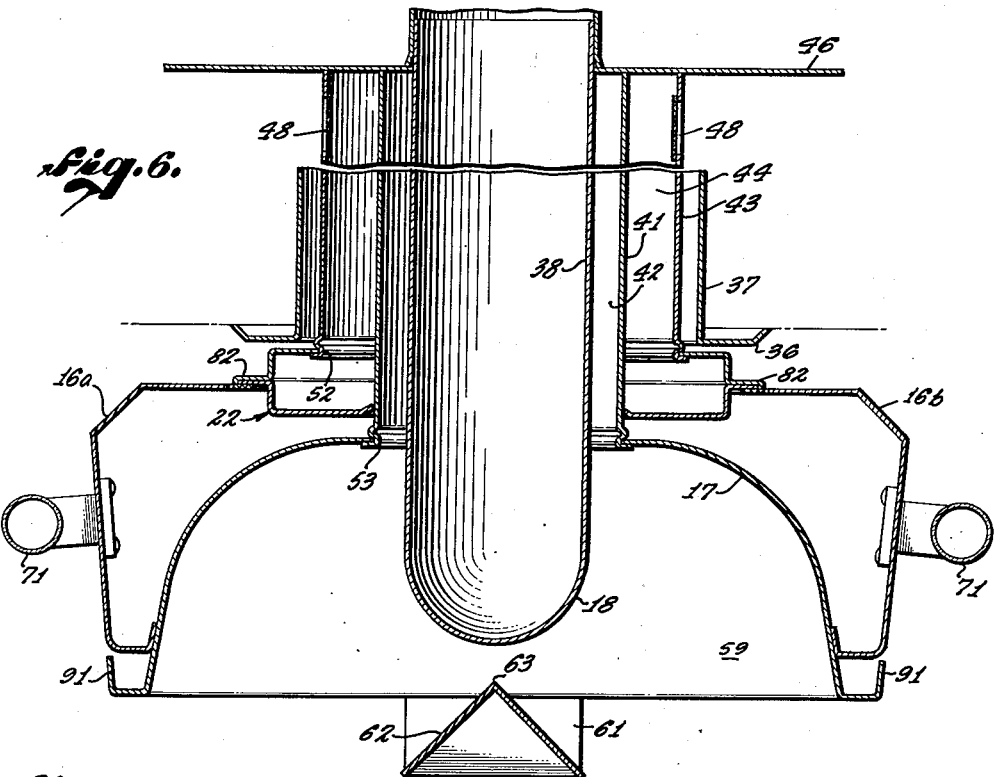
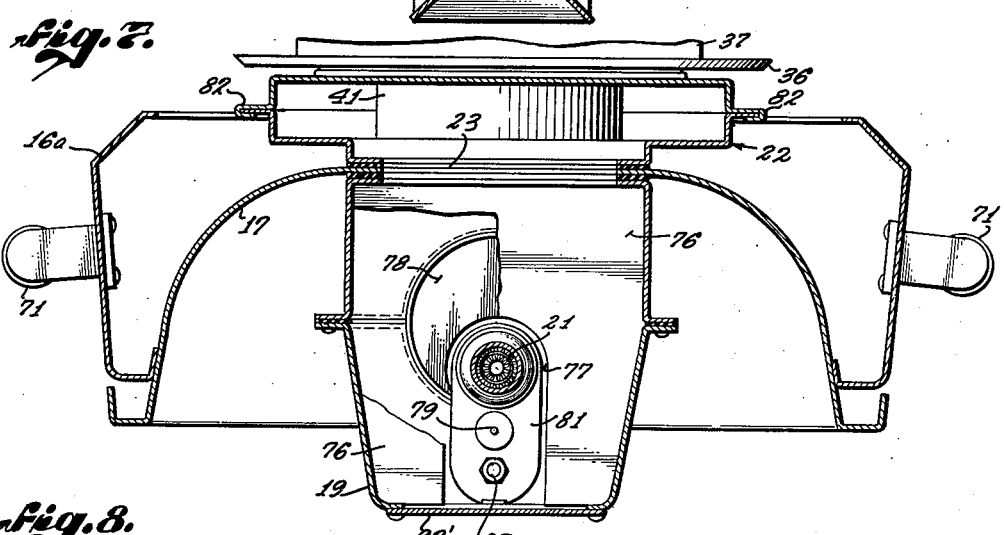
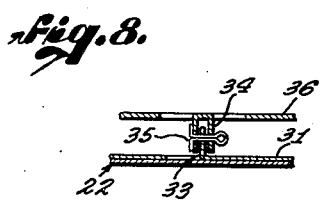

Aug. 21, 1956 W. G. CARTTER 2,759,472
OVERHEAD FUEL BURNING HEATERS
Filed Dec. 15, 1952 5 Sheets-Sheet 4
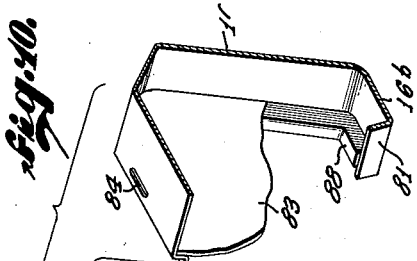
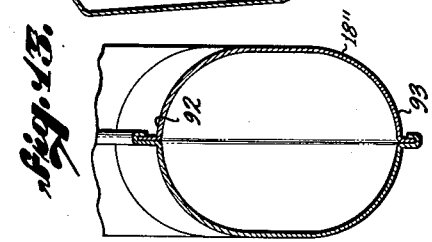
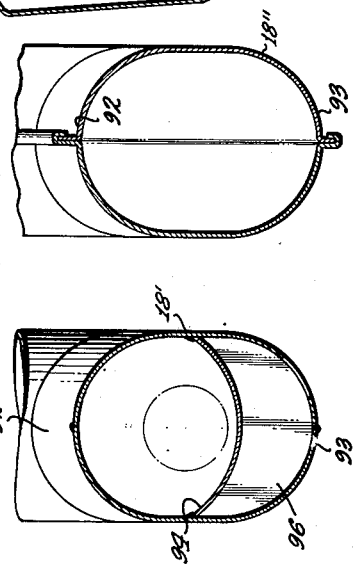
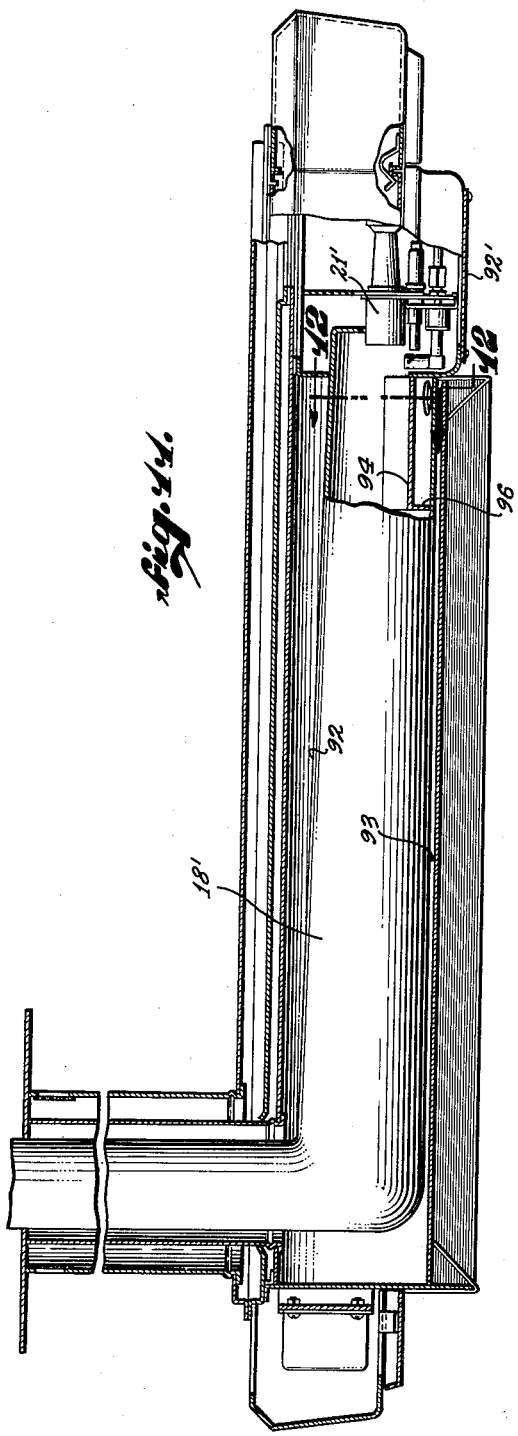
WILLIAM G. CARTTER,
INVENTOR.
HUEBNER, BEEHLER,
WORREL & HERZIG,
ATTORNEYS.
BY
Warren T. Jessup

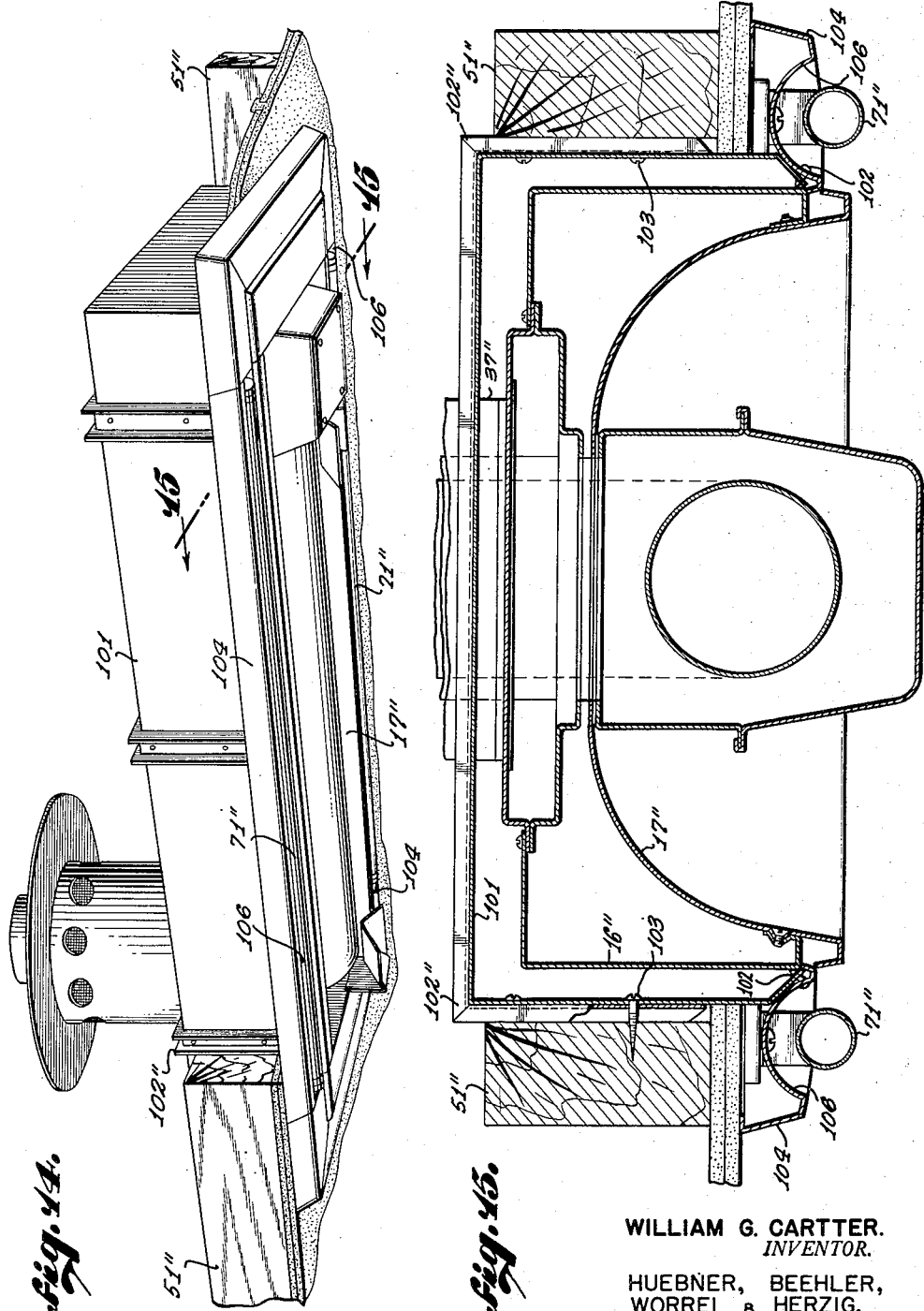

United States Patent Office 2,759,472
Patented Aug. 21, 1956

2,759,472

OVERHEAD FUEL BURNING HEATERS

William G. Cartter, Monrovia, Calif.

Application December 15, 1952, Serial No. 326,066

9 Claims. (Cl. 126—91)

This invention relates to overhead fuel burning heaters, and more particularly to a radiant heater which neither draws its combustion air from nor discharges its combustion products into the space which is heated by the heater.

It is an object of this invention to provide an improved overhead fuel burning heater which neither draws combustion air from nor discharges combustion products to the space to be heated.

It is another object of this invention to provide a generally horizontal overhead fuel burning heater.

It is another object of this invention to prevent the upward transmittal of heat from a fuel burning overhead radiant heater. Where the heater is mounted within a room just beneath the ceiling, such prevention of upward heat transmission serves to keep the ceiling from becoming dangerously hot.

It is another object of this invention to provide improved means for conveying combustion air to, and conveying combustion products away, from a fuel burning heater.

It is another object of this invention to provide a fuel burning heater which will maintain even burning characteristics in spite of transient fluctuations in air pressure in the regions from which the combustion air is drawn, and to which the combustion products are discharged.

It is a further object of this invention to provide for even burning of the heater as specified immediately above, without running the danger of mixing combustion products back into incoming combustion air as would be the case if intake and outlet were adjacent each other.

It is another object of this invention to provide means for shielding persons in the room directly below the heater from excessive downward radiation from the heater.

It is another object of this invention to provide in a fuel burning heater means for preventing back burning, i. e. for preventing the flame at the heater burner from turning back and burning toward the incoming air.

It is a further object of this invention to provide a combined overhead fuel burning heater and lighting unit whereby heat and light may be independently supplied from a single, integral overhead unit.

In accordance with these and other objects which will become apparent hereinafter, certain forms of the instant invention will now be described with reference to the accompanying drawings wherein:

Fig. 1 is a perspective view looking upward on a heater constructed according to the instant invention, with the ceiling to which the heater is mounted being eliminated to show more fully the complete heater.

Fig. 2 is a view looking directly upward against the under side of the heater, with a portion of the heat deflector being broken away to better show details of construction.

Fig. 3 is a longitudinal elevational section taken on line 3—3 of Fig. 2.

Figs. 4, 5, 6, and 7 are cross-sections taken on the corresponding section lines of Fig. 3.

Fig. 8 is a fragmentary cross-section taken on line 8—8 of Fig. 3.

Fig. 9 is a sectional view showing the complete mounting of a heater inside a room, and the projection of its flue pipe through the roof of the building.

Fig. 10 is a fragmentary and exploded perspective showing certain constructional details of the heater casing.

Fig. 11 is an elevational longitudinal section of a first modification of the instant invention.

Fig. 12 is a cross-section on line 12—12 of Fig. 11.

Fig. 13 is a cross-section similar to Fig. 12 of a modified form of combustion tube.

Fig. 14 is a perspective view looking upward on a second modified form of the invention, with a portion of the ceiling structure broken away to show the mounting of the heater within the ceiling structure.

Fig. 15 is a cross-section taken on line 15—15 of Fig. 14.

Referring to the drawings, 16 designates a heater casing, within which is mounted an elongate, downwardly dished reflector 17 having generally free access to the room space beneath the heater. Within the confines of the reflector 17 is mounted a hollow heating element in the form of a generally horizontal combustion tube 18. It has been found in practice desirable to tilt the tube 18 upward slightly, as shown in Fig. 3.

The lower end of the tube 18 communicates with a burner housing 19, within which is mounted a gas burner 21 disposed to emit a flame into the tube 18 (to the left in Fig. 3). Forming the roof of the casing 16 is an elongate flattened incoming air conduit 22 (Fig. 5), the length and flattened dimension of which are disposed generally horizontally. These horizontal dimensions are such that the conduit 22 completely overlies the tube 18, so that upflowing heat from tube 18, both radiant and convection, is intercepted by the conduit 22. At one end of the conduit 22, above the housing 19, the conduit 22 is open at the bottom so as to communicate, through an opening 23, with the back portion of the housing 19.

The heater, and more specifically the conduit 22, is secured, in the present embodiment, to the ceiling 24 of a room whose occupants are to be heated by the heater. In the present instance, the securement takes the form of two U-shaped brackets, one of which is shown at 26 secured firmly by any suitable means against the ceiling 24 and mating with a similar bracket 27 secured transversely atop one end of the conduit 22. Through the overlapping tabs 28 of the brackets 26 and 27 there is passed a long cotter pin 29. In this manner the right-hand end of the heater (Fig. 3) is supported. The left-hand end of the heater is supported by providing an outward flange 31 of the conduit 22 with a bent-up tab 33 (Fig. 8) which fits within a second U-shaped bracket 34 formed by bending down two tabs cut out of a flange 36 of a chimney 37 in the ceiling 24, to be described hereinafter. Through registering holes in the tabs 33 and 34 there is passed a cotter pin 35.

The upper end of the tilted tube 18 communicates with a vertical flue 38, which passes upward concentrically through the chimney 37 into and through the attic space 39 (Fig. 9) of a building in which the room to be heated is located. Concentrically circumjacent the flue 38, and within chimney 37, is a first cylindrical wall 41 which forms, with the flue 38, an annular dead air space 42 around the flue. A second concentric wall 43 is spaced outwardly from the wall 41, and the annular space 44 therebetween communicates at its lower end with the flattened conduit 22. The walls 41 and 43 terminate a foot or so above the ceiling 24. Extending outwardly immediately circumjacent the flue 38 is a flat baffle plate or ring 46, which serves to cap or close the two annular spaces 42 and 44, and also serves to shield incoming air against the reception of combustion products which might momentarily be discharged from the flue 38 through the downdraft diverter 47, to be described hereinafter. A series of screened inlet air openings 48 are provided in the wall 43 immediately beneath the baffle 46, and through these openings combustion air is admitted from the attic 39 to the annular space 44 and thence through the flattened conduit 22 to the burner housing 19.

The chimney 37 is fitted closely within an opening formed through the ceiling 24, and is supported by a tab 49 which extends over, and is secured to, the top of one of the ceiling joists 51. The bottom end of the cylindrical wall 43 is secured to the conduit 22, as shown at 52, where the annular space 44 communicates with the conduit 22. In similar manner the cylindrical wall 41 is secured to the reflector 17, as shown at 53. The flue 38 supports the left-hand end (Fig. 3) of the combustion tube 18, and is in turn supported at 54 by the baffle plate 46 supported on the upper edges of the walls 41 and 43.

From the baffle plate 46 the flue 38 continues upwardly through the attic 39 and emerges through the roof 56 of the building. At the top it is capped by any suitable weather guard 57. In the flue 38, between the plate 46 and the roof 56, is interposed a downdraft diverter 47 providing, in conventional fashion, an escape opening 58 for combustion products from the flue 38 into the attic 39. In case there should be a stoppage of flow in the flue 38 above the diverter 47, or in case there should be a transient downdraft which would otherwise tend to blow combustion products back into the combustion tube 18, the gas will instead escape out the vent 58.

By positioning the air inlets 48 in the same general region as the relief opening 58 provided in the diverter 47, there is obviated the adverse effect on flame characteristics which would occur with transient pressure changes in the air inlet region. At the same time, by normally discharging the combustion products into still another region, namely, the open atmosphere above the roof 56, there is no danger, under normal operation, of mixing burned gases back into the inflowing combustion air. Even during a momentary spillage of combustion products through the opening 58, as discussed above, admixture of the burned gases into the incoming air is substantially precluded by the baffle plate 46, for it will be remembered that the combustion products in general are warmer than the attic air, and will tend to rise once they clear the lip of the diverter 47.

The end of the reflector 17 remote from the burner housing 19 is closed by an end wall 59 to which is secured a downward tab 61. The end of tab 61 is pointed and turned upward as shown in Figure 3 to receive one end of a channel-shaped deflector 62 which is peaked longitudinally, as shown at 63, so that the upper surface of the deflector 62 slopes downwardly and outwardly on each side of the peak 63. This serves to shield room occupants immediately beneath the heater from directly downward radiation. The opposite end of the deflector 62 is similarly suported by a tab 60 secured to the housing 19.

The casing 16 is somewhat in the nature of a hollow ring surrounding the combustion tube 18. The two ends of the casing 16, which externally appear substantially identical, as shown in Figs. 1 and 2, are constituted of a housing 64 across the left-hand end of the heater (Fig. 3), and a housing 66 across the right-hand end. The housing 66 communicates with the burner housing 19 and contains the various valves, solenoids, and other controls 65 needed to properly operate the heater burners, including the main burner 21 and the pilot burner 67. Upwardly from the housing 66 projects, through the ceiling 24, a gas pipe 68, which conveys combustion fuel for the burner 21 to the valves contained in the housing 66.

The opposite housing 64 forms a convenient container for an electrical transformer or ballast 69 required by fluorescent tube lights 71 secured longitudinally one on each side of the exterior of the casing 16, as seen in Figs. 1, and 5.

One of the features of the present invention lies in a baffle means within the burner housing 19, which makes possible the satisfactory operation of the horizontal burner 21 without danger of back burning. "Back burning" is the term applied to the phenomenon in which a flame from a burner, instead of directing itself in the desired direction, curves back and tends to burn in the direction of the incoming combustion air. Such a phenomenon is very rare in burners which are pointed upwardly, because the heat of the burned gases naturally causes them to rise away from the incoming combustion air which approaches the burner from the sides and bottom of the burner. However, when a burner is placed horizontal, or nearly so, so that incoming secondary combustion air approaches from one side and the flame burns toward the opposite side, it is often a critical situation whether the flame will direct itself in the desired direction, or will curl back around the burner toward the incoming secondary combustion air. Danger of back burning is greatest when the heater is cold and the burner has just been started. This is because there is as yet little or no flue draft to draw the flame in the desired direction. Under this condition it is not unusual for the flame to curl back over the top of the burner and burn into the incoming combustion air conduit, and then having exhausted the combustion air therein to burn itself out.

In accordance with the instant invention, back burning is substantially prevented by the provision of vertical partitions or baffle plates 76 and 78 in the housing 19, which are positioned transversely of the burner 21 back of the mouth thereof. The baffle plate 76 has an arch way 77 therein through which combustion air may be admitted from the rear portion of the housing 19, to the forward portion of the housing 19, and thus supply secondary air to the flame at the mouth of the burner 21. The baffle plate 76 forces the incoming secondary air to approach the mouth of the burner 21 from the sides and bottom thereof principally, and this virtually eliminates the tendency of the flame to back burn.

The second partition 78 is provided around the burner 21 at the ingress of the combustion tube 18; it also tends to deflect the secondary air downward and force it to encounter the burner flame from the sides and bottom.

The burner 21 derives its primary air, as well as its secondary air, from the conduit 22, the former entering the burner through venturi opening 70.

For convenience of mounting, the burner 21, a thermostatic bulb 79 and the pilot burner 67 are secured in vertical alignment by a mounting plate 81, around which the air passes on its way to the main burner and to the pilot 67.

Flue draft, which is especially important during starting of the burner, when the heater is cold, is further improved—with consequent obviating of back burning—by mounting the combustion tube 18 so that it has a slight upward tilt from the burner end at 21 to its juncture with the flue 38. This slight up tilt, while not detracting measurably from the substantial horizontal mounting of the tube 18 insofar as appearance and as heat received by room occupants is concerned, does have a marked effect on the draft within the combustion tube 18, particularly at starting of the heater.

For convenience of initial explanation, the reflector 17, and tube 18, have been referred to as being mounted within a casing generally designated at 16 of which the conduit 22 forms the roof. In actual practice it is preferred as shown in the drawings and explained hereinbefore, to mount the above mentioned reflector, tube, and conduit securely to the ceiling 24, and constitute the casing 16 simply of longitudinal shells 16a and 16b. The bottom edge of each shell is inturned and secured by screws or welding to the reflector 17, as shown at 81; the upper edge of each shell is secured to the horizontal flange around the conduit 22, as shown at 82. Each shell, e. g., shell 16b, is provided with an end wall 83 (Fig. 10). In the top wall of the casing near the end, there is formed a slot 84 adapted to receive a tab 86 secured to, or formed from, the end housing 64. The tab 86 is slipped into the slot 84, thus securing the top of the housing 64 to the casing shell 16b; and a resilient clip 87 overhangs the bottom inner edge of the housing 64 and is snapped over a lip 88 formed on the casing shell 16b just outside the wall 83. There are two tabs 86 on the housing 64—one at each side thereof, which allow the housing 64 to be secured to each of the two casing shells 16a and 16b. The opposite housing 66 is secured to the other end of the two casing shells 16 in substantially the same way.

The two housings 64 and 66 are closed at the bottom by bottom plates 89.

For decorative purposes the two bottom edges of the reflector 17 are turned up to coincide with the side walls of the casing 16 as shown at 91.

In order to permit access for minor repairs and adjustment to the burners 21 and 67, and also to permit the pilot light to be lit, the bottom of the housing 19 is provided with a trap door 92'.

Referring now to Figs. 11 and 12, a modified form of the invention is shown, differing from the first form described hereinbefore principally in the shape of the combustion tube 18. As mentioned hereinbefore, it has been found highly desirable to provide the combustion tube 18 with a slight upward slope to promote initial draft when the heater is cold. This initial draft comes about by virtue of the upward slope of the top wall of the tube 18. In case the slope on the lower wall of the tube 18 is found to be esthetically objectionable, the same result functionally may be achieved by providing a tube of the shape shown at 18' in Fig. 11. The tube 18' is provided with a top wall 92, which slopes upwardly away from the burner 21' while the bottom wall 93 is maintained horizontal. This produces a tube 18' which gradually expands in cross section, as shown in Fig. 11.

The tube 18 shown in Fig. 5 is of constant cross-section throughout its length and of seamless one-piece construction. Fig. 12 shows how the tube (18'), in this case of expanding cross-section, may be made of two-piece construction with longitudinal seams welded along the top and bottom. In Fig. 13 a third form of the tube is shown in the form of 18", which is like the tube 18' in that it is of two-piece construction. However, the longitudinal seams of tube 18", instead of being welded as in Fig. 12, are effected by crimping one flange over another as shown in Fig. 13.

In the modification shown in Fig. 11, the burner 21', instead of being mounted in line with the lower portion of the tube 18', as with the Fig. 3 modification, is mounted so as to project its flame into the center of the tube. In this event it has been found desirable to mount a saddle member 94 on the bottom of the tube 18' extending a short distance away from the burner, terminating the saddle with a transverse wall 96. In other respects the heater shown in Fig. 11 is substantially like the first form shown in Fig. 3.

A third form of the heater is shown in Figs. 14 and 15. This form is adapted to be recessed upward into the ceiling itself, and is therefore especially suitable for installation in newly built homes during the construction of the house. The essential elements are basically the same as those shown hereinbefore. In this third form of the heater, the casing shells 16" are made substantially orthogonal, and an outer casing 101 is provided, the bottom edge of which is secured to shell 16" as shown at 102, and the upper wall of which is secured to the outer cylinder 37" where it passes through the outer shell 101.

Transversely around the outside of the outer casing 101 extend a plurality of channel members 102" which serve to strengthen the shell and also to space it from the ceiling joists 51", between which the heater is mounted. Wood screws 103 pass outwardly through the casing 101 and channels 102 into the joists 51" to secure the heater to the ceiling.

In this form of the invention special side members 104 are provided, extending longitudinally along each edge of the heater reflector 17". Each member 104 is shaped to form a concave reflector 106 beneath which is mounted the fluorescent tube 71".

The operation of the heater will now be specifically described with particular reference to Fig. 3. When it is desired to place the heater in operation, the user opens the trap door 92', removes the bottom 89 of the housing 66, turns on the pilot valve embodied in the controls 65, and lights the pilot burner 67. He then closes the trap door 92 and turns on the main valve embodied in the controls 65. If the thermostat in the room is demanding heat, the solenoid valve in the assembly 65 will be open and the burner 21 will be supplied with gas, which will be ignited by the pilot 67.

The first flame from the burner 21 encounters a relatively cold combustion tube 18. Under this condition the upward slope of the top wall of the tube 18 is especially important, for a slight updraft is thereby provided for the flame at the burner 21, which tends to draw it toward the vertical flue 38. Any tendency of the flame at the burner 21 to back burn through the housing 19 and into the conduit 22 is minimized by the vertical baffles 76 and 78, which force the secondary air to flow downwardly to the bottom of the housing 19 so that they approach the burner 21 from beneath its flame.

Once the heater has been in operation for a while, any critical period is past, because the up draft of hot gas in the flue 38 is amply sufficient to create a good draft within the combustion tube 18.

After the heater has been in operation for some time, there is a tendency for the heat to flow—principally by conduction and radiation—upwardly from the reflector 17 to the conduit 22. This heat would normally gather and rise against the ceiling 24 where a dangerous fire hazard might be created. However, the interposition of the flattened inlet air conduit 22 eliminates this fire hazard, because the heat is not permitted to gather beneath the ceiling, but instead is constantly withdrawn by the incoming combustion air flowing to the right in the conduit 22. Thus the ceiling 24 is maintained quite cool, and at the same time the combustion air is slightly preheated, thereby producing better burning at the burner 21.

The preheating of the incoming combustion air, even though relatively slight, tends to decrease the over-all draft in the heater, and it is therefore desirable to minimize this preheating of the incoming air at least until such time as it actually enters the flattened conduit 22. For this reason the insulating dead air space 42 is provided, so as to hold to a minimum the heating of the down flowing air in the annular space 44 before the air enters the conduit 22.

As touched on hereinbefore, it is a feature of this invention that fresh air is taken in through the openings 48 in substantially the same region as the relief openings 58 in the flue 38. This has the advantage that any transient pressure variations in this region will be reflected equally into the inlet end of the combustion air circuit and into the relief end of the circuit. Thus more even burning at the burner 21 is assured, even during transient downdrafts in the flue 38 and transient pressure changes around the inlet 48.

The baffle plate 46 serves as a factor of safety to minimize inter-mixing of burned gases back into the heater inlet, even during a short period of a transient spill-over under the lip of the downdraft hood 47.

It will be appreciated from the above description that heating by the instant invention is effected without either taking combustion air from the room space being heated, or exhausting burned gases into the space being heated. Instead, both the inlet and the outlet are in a space above the room space which is being heated.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus, and articles.

What is claimed is:

1. In a heater adapted to be mounted at the upper portion of a room space, the combination including: a heat radiating tube adapted to be mounted substantially horizontally, high in said space; a conduit substantially coextensive in length with said tube and of a horizontal width substantially equal at least to the horizontal width of said tube and spaced above said tube to permit circulation of air between said tube and conduit; a burner located near one end of said tube and positioned to emit hot gases into the tube to heat the same; conduit means communicating between said conduit and said tube at the burner end thereof; means for conveying combustion air to said conduit near its end remote from said burner; and means for conveying combustion products away from said tube at its end remote from said burner, whereby at least a portion of the combustion air for said burner flows through said conduit and into said tube at the burner end thereof, thereby providing an insulation of relatively cool incoming air above the hot tube.

2. An overheat heater adapted to be mounted above a space to be heated, comprising in combination: a flattened incoming combustion air conduit adapted to be disposed overhead with its length and flattened dimension residing generally horizontally, a combustion tube mounted beneath said flattened conduit substantially parallel and in spaced relation thereto and communicating therewith at the burner end of said tube, a burner located at the burner end of said tube in position to emit hot gases into said tube, at least a portion of the combustion air for said burner flowing thereto through said flattened conduit, whereby an insulation of constantly flowing relatively cool incoming air is maintained spaced above the combustion tube, a generally vertical discharge flue communicating with said combustion tube at the end of the tube remote from said burner and adapted to convey combustion products upwardly above said space, and an inlet conduit disposed around said discharge flue and communicating at its lower end with said flattened conduit and adapted to communicate at its upper end with a region above said space to convey combustion air to the flattened conduit.

3. A ceiling heater adapted to be mounted high in a room space immediately below the ceiling of the room, comprising in combination: a flattened incoming combustion air conduit adapted to be disposed beneath the ceiling with its length and flattened dimension residing generally parallel to the ceiling; a combustion tube mounted beneath and spaced from said conduit substantially parallel thereto, and communicating therewith at the burner end of said tube, said flattened dimension being at least substantially as wide as said tube; a burner located at the burner end of said tube in position to emit hot gases into said tube, at least a portion of the combustion air for said burner flowing through said flattened conduit, whereby an insulating layer of constantly flowing relatively cool incoming air is maintained above the combustion tube between the tube and the room ceiling; a generally vertical discharge conduit communicating with said combustion tube at the end of the tube remote from said burner, and adapted to pass upwardly through said room ceiling into the space above the room; and an inlet conduit disposed substantially concentrically around said discharge tube and communicating at its lower end with said flattened conduit and adapted to communicate at its upper end with said space above the room to provide combustion air to the flattened conduit.

4. In combination, a room having a ceiling thereabove, an elongate heat radiating tube mounted substantially horizontally beneath said ceiling, a conduit substantially coextensive in length with said tube and of a horizontal width substantially equal at least to the horizontal width of said tube and spaced between said tube and said ceiling to permit circulation of air between said tube and said conduit, a burner located near one end of said tube and positioned to emit hot gases into the tube to heat the same, vent means communicating with said tube at the other end thereof for conveying combustion products away from said tube, conduit means communicating between said conduit and said tube at the burner end thereof, and inlet air means communicating wth said conduit at the other end thereof for admitting combustion air through said conduit to said burner, thereby providing an insulation of relatively cool incoming air spaced above said tube.

5. In combination, a room having a ceiling thereabove, a heat radiating tube mounted substantially horizontally in said room beneath said ceiling, an inlet air conduit disposed between said ceiling and said tube, a burner located near one end of said tube and positioned to emit hot gases into the tube to heat the same, a vent conduit communicating with the other end of said tube and effective to evacuate combustion products from said tube, conduit means communicating between said conduit and said tube at the burner end thereof, and inlet air means communicating with said conduit at the other end thereof for admitting incoming air through said conduit to said burner, thereby providing an insulation of relatively cool incoming air between the heat radiating tube and the ceiling.

6. In a heater adapted to be mounted at the upper portion of a room space, the combination including: a heat radiating tube adapted to be mounted substantially horizontally, high in said space; a conduit substantially coextensive in length with said tube and of horizontal width several times its depth vertically and substantially equal at least to the horizontal width of said tube, said conduit being spaced above said tube to permit circulation of air between said tube and conduit; a burner located near one end of said tube and positioned to emit hot gases into said tube to heat the same; conduit means communicating between said conduit and said tube at the burner end thereof; means for conveying combustion air to said conduit near its end remote from said burner; and means of conveying combustion products away from said tube at its end remote from said burner, whereby at least a portion of the combustion air for said burner flows through said conduit and into said tube at the burner end thereof, thereby providing an insulation of relatively cool incoming air above the hot tube.

7. In a heater adapted to be mounted at the upper portion of a room space, the combination including: a heat radiating tube adapted to be mounted substantially horizontally high in said space; a conduit substantially coextensive in length with said tube and of a horizontal width substantially equal at least to the horizontal width of said tube, and spaced above said tube to permit circulation of air between said tube and conduit; a burner located near one end of said tube and positioned to emit hot gases into the tube to heat the same; reflector means positioned intermediate said tube and said conduit for intercepting radiant heat directed upward and reflecting it downward into said room space; conduit means communicating between said conduit and said tube at the burner end thereof, means for conveying combustion air to said conduit near its end remote from said burner; and means for conveying combustion products away from said tube at its end remote from said burner, whereby at least a portion of the combustion air from said burner flows through said conduit and into said tube at the burner end thereof, thereby providing an insulation of relatively cool incoming air above the hot tube.

8. In a heater adapted to be mounted above a space to be heated, the combination including: a heat radiating tube adapted to be mounted substantially horizontally above said space; a conduit substantially coextensive in length with said tube and of a horizontal width substantially equal at least to the horizontal width of said tube and spaced above said tube to permit circulation of air between said tube and conduit; a burner located near one end of said tube and positioned to emit hot gases into the tube to heat the same, conduit means communicating between said conduit and said tube at the burner end thereof; means for conveying combustion air to said conduit near its end remote from said burner; and means for conveying combustion products away from said tube at its end remote from said burner, whereby at least a portion of the combustion air for said burner flows through said conduit and into said tube at the burner end thereof, thereby providing an insulation of relatively cool incoming air above the hot tube.

9. In a heater adapted to be mounted at the upper portion of a room space having a ceiling, the combination including: a heat radiating tube adapted to be mounted substantially horizontally, high in said space; a conduit substantially coextensive in length with said tube and of a horizontal width substantially equal at least to the horizontal width of said tube and spaced above said tube, to permit circulation of air between said tube and conduit; a burner located near one end of said tube and positioned to emit hot gases into the tube to heat the same; conduit means communicating between said conduit and said tube at the burner end thereof; means for conveying combustion air from a region above said ceiling to said conduit near said burner; and means for conveying combustion products away from said tube at its end remote from said burner to a region above said ceiling, whereby at least a portion of the combustion air for said burner flows through said conduit, thereby providing an insulation of relatively cool incoming air above the hot tube.

References Cited in the file of this patent

UNITED STATES PATENTS

| | | |
|---|---|---|
| 1,139,672 | Gosline | May 18, 1915 |
| 1,175,120 | Brelle | Mar. 14, 1916 |
| 1,695,308 | Wilt | Dec. 18, 1928 |
| 1,743,402 | Siebring | Jan. 14, 1930 |
| 2,439,038 | Cartter | Apr. 6, 1948 |
| 2,582,066 | Resek | Jan. 8, 1952 |
| 2,617,407 | Johnson | Nov. 11, 1952 |
| 2,619,022 | Hergenrother | Nov. 25, 1952 |
| 2,711,683 | Ryder | June 2, 1955 |

FOREIGN PATENTS

| | | |
|---|---|---|
| 180,810 | France | Jan. 11, 1887 |
| 217,701 | Great Britain | June 26, 1924 |